Patented Jan. 26, 1937

2,069,178

UNITED STATES PATENT OFFICE 2,069,178

METHOD OF DISPERSING RESINS AND COMPOSITION PRODUCED THEREBY

Harry M. Dent, Buffalo, Sydney H. Hall, Kenmore, and Lothar A. Sontag, North Tonawanda, N. Y., assignors to General Plastics, Inc., North Tonawanda, N. Y.

No Drawing. Application June 27, 1932,
Serial No. 619,598

4 Claims. (Cl. 106—22)

The present invention relates to the preparation of dispersions of synthetic resinous materials and more particularly to the preparation of resins in the colloidal state or condition and to the compositions produced.

Heretofore it has been impossible to produce relatively stable dispersions of synthetic resins with non-solvents or with mixed or partial solvents of synthetic resins. Such solutions as have been used heretofore comprise either true solutions of the resin base in a true resin solvent, or of gross heterogeneous mixtures of the resin base and another vehicle which are readily separable into the components or constituents.

The present invention provides a method whereby synthetic resins may be readily and expeditiously dispersed, comminuted and subdivided in order to produce a material which is in the colloidal state or condition; a synthetic or artificial resin or resin-like material which will remain dispersed throughout a convenient and proper dispersing medium; a synthetic resin or resin-like mass which will remain dispersed in colloidal form in a non-solvent or partial solvent thereof; a synthetic resin or resin-like mass dispersed with a convenient vehicle or liquid capable of dilution with water or other vehicle with which it is dispersed; a resinous mass which when properly dispersed in accordance with the procedure about to be disclosed, may be concentrated to any desired degree and thereafter may be dispersed by mere addition to and agitation with proper dispersing vehicles or agents.

This invention, therefore, comprises the preparation of a dispersed synthetic resin, as for instance those of the phenol formaldehyde type, with a desirable vehicle or liquid medium with which the resin base is either insoluble or in which it is only partially soluble. In short, the invention comprises the homogenization of a suitable resin base with suitable liquid media.

Resin bases suitable for dispersion and homogenization comprise phenolic condensation products including the cresols and higher homologs of phenol such as the type represented by the commercial resin known as "Durez", as well as other well known and commercial synthetic resins of the phenolic type, other resinous materials such as the phthalic anhydride types and certain other classes of synthetic resins.

The vehicles or media with which the resin base is dispersed or homogenized, comprise, in general, liquids with which the resin base is not miscible and in which it is not soluble, or wherein only partial solubility occurs. While it has been found, for the purposes of this invention, that water is highly desirable as a medium to be homogenized with the resin on account of the non-solubility of the resin base therein, and on account of the ready availability and economical desirability of its use, the invention nevertheless contemplates the use of other liquid media with which the resin base may be dispersed. In the preparation of certain types of colloidal dispersed or homogenized products, it may be found desirable to use certain non-aqueous liquids such as benzine, naphtha and others as dispersion media. It will be found, however, that for most purposes water can be satisfactorily used and dispersed with the resin base. The dispersion and homogenization should be carried out under controlled conditions whereby the acidity is maintained between about pH 3 to pH 8, resins of higher homologs of phenol require a more acidic condition than phenol itself.

In the preparation of the dispersion of the present invention, suitable raw materials, such as phenol or its homologs and aldehyde, such as formic, acetic or other suitable aldehydes, are mixed in the usual fashion and condensed according to well known procedures in the presence of a desirable condensing agent such as an alkali or an acid. The resultant water insoluble resinous material, after suitable washing with water, is subjected to the homogenizing action of a conventional type of colloid mill at an elevated temperature and preferably above the melting point of the resin. After passage of the mixed resinous condensation product and desirable vehicle through the colloid mill, which passage may under some conditions be desirably repeated, it is subjected to a suitable treatment whereby the resinous condensation product is advanced to any desired stage.

In general, this resinous material is sufficiently advanced by subjecting the homogenized and dispersed mixture to a heat treatment carried out at a suitable temperature of from about 60 degrees centigrade to the boiling point of the mixture. The duration of the advancing step or stage of the process is dependent upon the character of the resin base, upon the character of the medium dispersed and commingled with the resin, and upon the degree to which it is desired to advance the resinous base. Ordinarily, proper advancement is obtained in several hours, say 2 to 4 hours.

Prior to advancement, the dispersed mixture of resin and water is compatible and miscible with acetone; when the proper stage of advancement has been reached, the colloidal dispersion of resin is only partially soluble in acetone and only slightly soluble in ethyl alcohol.

This heating operation, producing the advancement of the resin, may be performed either in a closed apparatus designed to reflux any escaping materials or may be performed in open vessels wherein the vapors above the heated vessel are permitted to escape and evaporation to occur.

The homogenized and advanced mixture can be evaporated to suitable concentration or consistency and still maintain its characteristics as a colloidal or dispersible mixture. That is to say, any suitable proportion of the dispersed liquid medium can be removed by suitable evaporating procedure without destroying the dispersible properties or characteristics of the mixture, and a mixture so evaporated either partially or wholly, can thereafter be dispersed with a suitable medium to form a dispersed mixture possessing characteristics identical with those of a mixture initially produced by homogenization, as outlined hereinabove. Ordinary evaporation procedures can be used to effect evaporation to about 60% resin content. Further evaporation is to be performed under reduced pressures and at low temperatures. By suitable treatment, therefore, as disclosed herein, it is possible to change a non-dispersible resinous base to a resin base so condensed and characterized as to be readily and easily dispersible with a non-solvent liquid medium.

The product produced in accordance with this invention comprises a milky opalescent liquid, easily and readily diluted and thinned; a mixture which is substantially permanent in character, one which is not cracked by heat and one which is not cracked or broken readily by freezing; a mixture evaporable under suitable conditions to produce a fluffy or flaky powder readily despersible with water or with suitable media.

It may be noted that auxiliary dispersion aids, or "protective" substances should be added to aid or expedite the dispersion and to render the resultant mixture more stable. The substances which may be used for this purpose comprise soaps such as water soluble alkali or ammonia soaps, oil soluble ethanolamine soaps, alkaline substances such as ammonia, certain gums and gum esters, as for instance gum ghatti, gum arabic, sulfonated oils, dextrine or other suitable protective agents. It may be noted that certain nitrogenous materials such as gelatine, are not particularly useful as protective aids due to adverse influence of formaldehyde upon them. Where gums are used as protective colloids or dispersion aids, the acidity is maintained between the range pH 3 and pH 8 as heretofore mentioned, by the use of a suitable acid.

As an example, fifty (50) parts of a resin base such as "Durez", are homogenized with fifty (50) parts of water and ten (10) parts of gum ghatti by passage through a colloid mill, and the resultant mixture heated to 90 degrees centigrade until the resin is advanced to the proper stage. This operation will have been found to be complete within a period of three (3) to four (4) hours. It will, of course, be apparent that the duration of this treatment will vary in accordance with the temperature at which the operation is performed, being accelerated by increased temperatures and being prolonged at lower temperatures.

As another example, seventy (70) parts of a synthetic resin produced from phenol and formaldehyde are homogenized with thirty (30) parts of water and three (3%) per cent of gum arabic. The homogenization will be found to be complete after one or more passages through a conventional type of colloid mill and the milky mixture, containing a thermoplastic resin, is thereafter advanced by subjecting the mixture to a temperature of about 70 degrees centigrade for a period of several hours.

Dispersion mixtures of resin and water have been prepared in accordance with the above process wherein the quantity of resin base varied from about 25% to 75% of the mixture, the mixtures containing the higher percentage of resin being viscous and heavy, those with the lower percentage of resin being more fluid and mobile.

The products produced, as outlined herein, possess certain desirable and practical characteristics; they possess remarkable advantages as adhesives for use as glues and when used in the preparation of composite articles such as plywood, form a strong glue line wherein substantially all of the adhesive material remains between the surfaces of the articles to be glued and substantially none of the material penetrates the fibres or interstices of the bonded elements. Since the strength of the glue line is dependent upon the amount of adhesive between the surfaces of the bonded articles and since the loss of adhesive due to penetration is eliminated, the dispersed mixtures of this invention are particularly advantageous for use in the production of high grade ply woods and bonded articles.

It will be readily apparent from the foregoing that this invention provides a dispersed mixture suitable for use as an adhesive which possesses inherent advantages over the glues presently in use; glue lines of a given thickness produced from this article or composition possess greater strength and resistance to shear than other types of adhesive. The composition of this invention is also particularly advantageous since a glue line is produced which is resistant to bacterial growth, does not putrefy, swell nor hydrolize in the presence of moisture.

Further, the amount of resin in the glue line determines the strength of the glue line up to a maximum strength. Mixtures with a low percentage of resin can be used for products of low strengths, such as laminated paper, while the mixtures of greater resin composition, as for instance 60% to 75% resin would be used upon materials of greater strength such as oak which would withstand pressures up to six hundred pounds per square inch or more.

Where the terms "dispersed" or "homogenized" are used in the following claims, they refer to the process of dispersion or homogenization effected by the action of a colloid mill whereby emulsions or suspensions of a material are produced so that small discrete particles are produced throughout a liquid called the dispersion medium.

What is claimed is:

1. A dry powdered composition comprising a heat hardenable synthetic resin partially advanced after homogenization with a non-solvent for the resin, said non-solvent having been subsequently removed, fluffy and flaky in character, readily and easily mixed with water to form a milky substantially permanent dispersion therewith.

2. A dry powdered composition containing a heat hardenable synthetic resin partially advanced after homogenization with a non-solvent, said non-solvent having been subsequently removed, and a dispersion aid, fluffy and flaky in character, readily and easily mixed with water to form a milky substantially permanent dispersion therewith.

3. A composition of matter comprising a heat hardenable phenol-formaldehyde resin dispersed in water in discrete particles, said resin being advanced beyond the stage of advancement possessed by the resin at the time the dispersion was effected, the advanced resin being heat hardenable and partially soluble in alcohol, the dispersion having a hydrogen ion concentration between pH3 and pH8.

4. A dry powdered composition containing a heat hardenable synthetic resin and a dispersion aid formed by homogenizing a heat hardenable resin and dispersion aid with a non-solvent for the resin, said non-solvent having been subsequently removed, fluffy and flaky in character, and easily mixed with water to form a milky substantially permanent suspension therewith.

HARRY M. DENT.
SYDNEY H. HALL.
LOTHAR A. SONTAG.